United States Patent
Moss (10) Patent No.: US 9,677,628 B2
(45) Date of Patent: Jun. 13, 2017

(54) DRUM BRAKE ASSEMBLY AND METHOD OF MANUFACTURE

(71) Applicant: ArvinMeritor Technology, LLC, Troy, MI (US)

(72) Inventor: Peter Moss, Detroit, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 389 days.

(21) Appl. No.: 14/027,595

(22) Filed: Sep. 16, 2013

(65) Prior Publication Data

US 2015/0075926 A1   Mar. 19, 2015

(51) Int. Cl.

| | | |
|---|---|---|
| *F16D 65/09* | (2006.01) | |
| *F16D 51/00* | (2006.01) | |
| *F16C 33/10* | (2006.01) | |
| *B23K 20/12* | (2006.01) | |
| *B23K 31/02* | (2006.01) | |
| *F16D 65/22* | (2006.01) | |
| *F16D 51/22* | (2006.01) | |

(52) U.S. Cl.
CPC ......... *F16D 65/09* (2013.01); *F16C 33/1065* (2013.01); *F16D 51/00* (2013.01); *B23K 20/129* (2013.01); *B23K 31/02* (2013.01); *F16D 51/22* (2013.01); *F16D 65/22* (2013.01); *F16D 2051/003* (2013.01); *Y10T 29/49826* (2015.01)

(58) Field of Classification Search
CPC .. F16D 51/22; F16D 2051/001; F16D 65/091; F16D 65/22; F16D 2125/56; F16C 33/10; F16C 33/106; F16C 33/1065
See application file for complete search history.

(56) References Cited

U.S. PATENT DOCUMENTS

| | | | | |
|---|---|---|---|---|
| 682,268 | A * | 9/1901 | Phillips | F16C 33/1065 |
| | | | | 384/291 |
| 2,625,448 | A * | 1/1953 | Underwood | F16C 17/026 |
| | | | | 184/6.5 |
| 5,649,612 | A | 7/1997 | Walker et al. | |
| 6,240,806 | B1 * | 6/2001 | Morris | B60T 1/067 |
| | | | | 188/205 R |
| 7,819,231 | B2 * | 10/2010 | Gibson, Jr. | F16C 33/04 |
| | | | | 188/329 |
| 8,696,208 | B1 * | 4/2014 | Everline | F16D 65/22 |
| | | | | 384/129 |
| 2002/0030399 | A1 * | 3/2002 | Scarlett | E04G 23/006 |
| | | | | 299/37.1 |

FOREIGN PATENT DOCUMENTS

FR        2497891 A1 *  7/1982  ............. F16D 65/22

OTHER PUBLICATIONS

Electronic translation of FR2497891A1.*

* cited by examiner

*Primary Examiner* — Anna Momper (74) *Attorney, Agent, or Firm* — Brooks Kushman P.C.

(57) ABSTRACT

A brake assembly and a method of manufacture. The brake assembly may have a bracket assembly that may include a brake wing and a mounting flange disposed at opposite ends of a tube portion. The bracket assembly may rotatably support a camshaft.

20 Claims, 6 Drawing Sheets

DRUM BRAKE ASSEMBLY AND METHOD OF MANUFACTURE

TECHNICAL FIELD

This patent application relates to a drum brake assembly for a vehicle and a method of manufacture.

BACKGROUND

A bracket for a vehicle brake assembly is disclosed in U.S. Pat. No. 5,649,612.

SUMMARY

In at least one embodiment, a brake assembly is provided. The brake assembly may have a bracket assembly that may receive a camshaft for actuating a brake pad assembly. The bracket assembly may include a brake wing, a mounting flange, and a tube portion. The brake wing may be adapted to support an actuator for actuating the camshaft. The mounting flange may be spaced apart from the brake wing. The tube portion may extend from the brake wing to the mounting flange. The brake wing, the mounting flange, and the tube portion may cooperate to define a hole that may receive the camshaft. The tube portion may have a lubricant passage. The lubricant passage may be spaced apart from the hole and may extend from the mounting flange to the brake wing. The lubricant passage may route lubricant between the brake wing and the mounting flange.

In at least one embodiment, a method of making a brake assembly is provided. The method may include extruding a tube portion with a hole and a lubricant passage that extend between a first end and a second end of the tube portion. A mounting flange may be positioned at the first end of the tube portion. A brake wing may be positioned at the second end of the tube portion. The mounting flange and the brake wing may be attached to the tube portion.

In at least one embodiment, a method of making a brake assembly is provided. The method may include providing a mounting flange, a tube portion, and a brake wing and positioning the mounting flange and the brake wing at opposite ends of the tube portion. The mounting flange and the brake wing may be friction stir welded to the tube portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
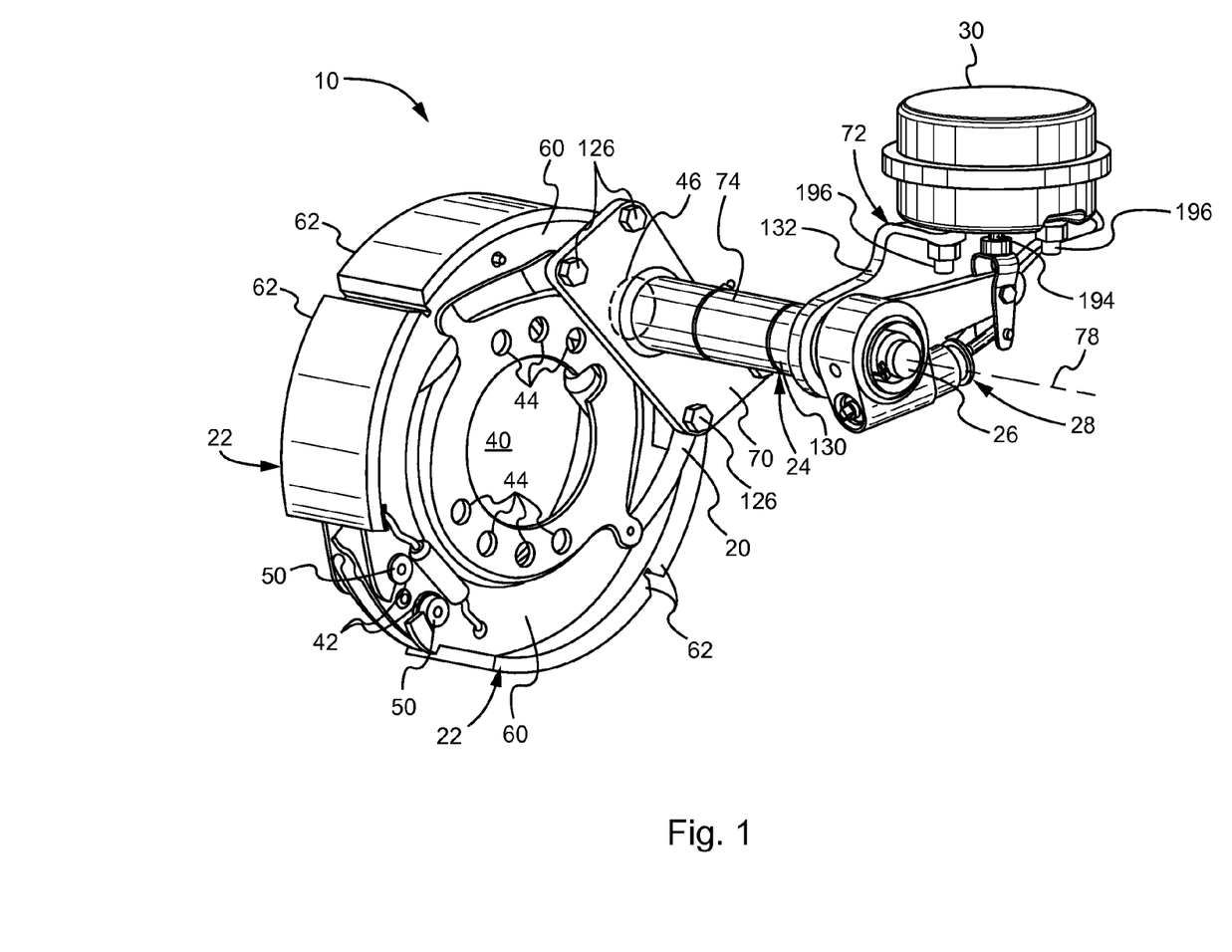
FIG. 1 is a perspective view of an exemplary brake assembly having a bracket assembly.

Referring to FIG. 1, an exemplary brake assembly 10 is shown. The brake assembly 10 may be provided with a vehicle, such as a motor vehicle like a truck, bus, farm equipment, mining equipment, military transport or weaponry vehicle, or cargo loading equipment for land, air, or marine vessels. In addition, the brake assembly 10 may be provided on a trailer that may be coupled to or provided with a motor vehicle.

The brake assembly 10 may be a friction brake that may be configured to slow or inhibit rotation of at least one associated wheel. In FIG. 1, the brake assembly 10 is depicted as a drum brake. In a drum brake configuration, a brake drum may extend continuously around brake pad assemblies that may be configured to engage the brake drum to slow the rotation of a wheel. The brake drum may be disposed between a wheel and a wheel hub assembly that may rotatably support the wheel. In at least one embodiment, the brake assembly 10 may include a spider 20, at least one brake pad assembly 22, a bracket assembly 24, a camshaft 26, a slack adjuster 28, and an actuator 30.

The spider 20 may support various components of the brake assembly 10. In addition, the spider 20 may facilitate mounting of the brake assembly 10 to the vehicle. For example, the spider 20 may be fixedly disposed on or fixedly disposed with respect to an axle assembly or a steering knuckle. In at least one embodiment, the spider 20 may include a hole 40 through which an axle and/or a spindle may extend. For example, a spindle may extend through the hole 40 and may support one or more wheel bearings that support and facilitate rotation of a wheel assembly. The spider 20 may also include at least one anchor pin hole 42, at least one spider mounting hole 44, and a camshaft opening 46.

The anchor pin hole 42 may receive an anchor pin 50 that facilitates mounting and operation of a brake pad assembly 22 will be discussed in more detail below. In the embodiment shown, two anchor pin holes 42 are provided that are generally disposed opposite the bracket assembly 24. Each anchor pin hole 42 may receive a different anchor pin 50, which in turn may support different brake pad assemblies 22.

A spider mounting hole 44 may facilitate mounting of the spider 20 to the vehicle. In FIG. 1, a plurality of spider mounting holes 44 are arranged around the hole 40. Each spider mounting hole 44 may receive a fastener, such as a bolt, that may extend through the spider mounting hole 44 and couple the spider 20 to another component, such as an axle assembly or a steering knuckle.

The camshaft opening 46 may receive the camshaft 26 and optionally a portion of the bracket assembly 24. The camshaft 26 may extend through the camshaft opening 46 to engage one or more brake pad assemblies 22.

The brake pad assembly 22 may include a brake shoe 60 and a friction material 62. The brake shoe 60 may be a structural member of a brake pad assembly 22. The brake shoe 60 may be pivotally mounted to the spider 20 at a first end via the anchor pin 50. More specifically, the anchor pin 50 may be fixedly positioned with respect to the spider 20 and the brake shoe 60 may pivot about an outer surface or circumference of the anchor pin 50 when the brake pad assembly 22 is actuated. An opposite end of the brake shoe 60 may have a cam roller that may be configured to engage the camshaft 26.

The friction material 62, which may also be called a brake lining, may be disposed on an outer surface of the brake shoe 60 and may face toward the brake drum. The friction material 62 may engage the brake drum during vehicle braking and may be spaced apart from the brake drum when the friction braking is not being applied.

The bracket assembly 24 may facilitate mounting of the camshaft 26, the slack adjuster 28, and the actuator 30. The bracket assembly 24 may include a mounting flange 70, a brake wing 72, and a tube portion 74. In addition, the bracket assembly 24 may have a hole 76 that may receive the camshaft 26. The hole 76 may be a through hole that extends through the bracket assembly 24. The hole 76 may extend along an axis 78 and may be defined by hole portions in the mounting flange 70, the brake wing 72, and the tube portion 74 as will be discussed in more detail below.

The mounting flange 70 and the brake wing 72 may interconnect with the tube portion 74 in various configurations as will be described in more detail below. For example, the mounting flange 70 and/or the brake wing 72 may have a male configuration and a corresponding portion of the tube portion 74 may have a female configuration in one or more embodiments. Similarly, the mounting flange 70 and/or the brake wing 72 may have a female configuration and a corresponding portion of the tube portion 74 may have a male configuration in one or more embodiments. In addition, the mounting flange 70 and/or the brake wing 72 may have neither a male nor a female configuration and may not overlap with tube portion 74. Such a non-overlapping configuration may employ generally parallel mating surfaces that may be adapted for attachment by thermal joining, such as by any suitable welding technique like butt welding or friction welding.

Figure 2:
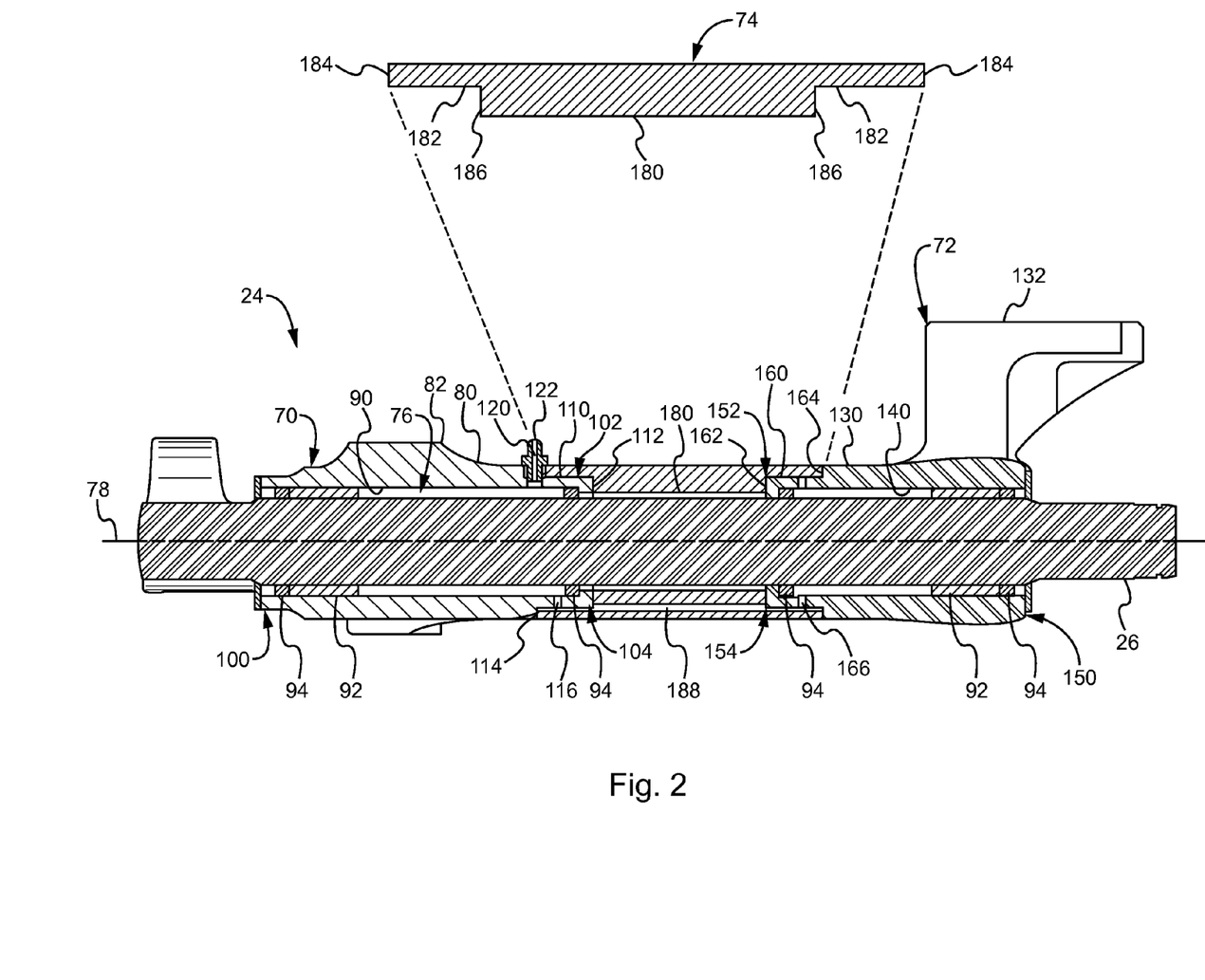
FIG. 2 is a section view of the bracket assembly.

Referring to FIG. 2, a bracket assembly 24 is shown in which the mounting flange 70 and the brake wing 72 have male configurations and the tube portion 74 has a female configuration.

The mounting flange 70 may facilitate mounting of the bracket assembly 24 to the spider 20. The mounting flange 70 may be spaced apart from the brake wing 72 and may be fixedly coupled to the tube portion 74. In at least one embodiment, the mounting flange 70 may have a mounting flange body 80 and a flange portion 82.

The mounting flange body 80 may have a generally tubular configuration and may define a portion of the hole 76 through which the camshaft 26 may extend. The mounting flange body 80 may have an interior surface 90 that may be radially disposed about the axis 78 and that may at least partially define the hole 76. The interior surface 90 may be spaced apart from the camshaft 26 to facilitate rotation of the camshaft 26 and to provide a cavity for receiving lubricant.

The portion of the hole 76 in the mounting flange body 80 may receive various components in addition to the camshaft 26. For example, the portion of the hole 76 in the mounting flange body 80 may receive a bearing 92 and one or more seals 94. The bearing 92, which may also be called or configured as a bushing, may extend around the camshaft 26 and from the camshaft 26 to the mounting flange 70 to rotatably support the camshaft 26. One or more seals 94 may also extend around the camshaft 26 and from the camshaft 26 to the mounting flange 70. The seals 94 may help contain a lubricant, such as grease, inside the hole 76 in the mounting flange 70 to lubricate the bearing 92.

The mounting flange body 80 may include a first body end 100 and a second body end 102. The first body end 100 may be disposed proximate the spider 20. The second body end 102 may be disposed opposite the first body end 100 and may be disposed proximate or may engage the tube portion 74. The second body end 102 may have an engagement portion 104. In the embodiment shown in FIG. 2, the engagement portion 104 has a male configuration that is configured to be received in the tube portion 74. The engagement portion 104 may have an outer surface 110, an end surface 112, a step surface 114, and a lubricant hole 116.

The outer surface 110 may be disposed proximate or may engage the tube portion 74. The outer surface 110 may be disposed opposite the interior surface 90 and may extend from the end surface 112 to the step surface 114. In at least one embodiment, the outer surface 110 may be a circumferential surface that may be radially disposed about the axis 78.

The end surface 112 may be disposed proximate or may engage the tube portion 74. The end surface 112 may extend from the interior surface 90 to the outer surface 110. In at least one embodiment, the end surface 112 may extend radially or may be disposed substantially perpendicular to the axis 78.

The step surface 114 may be disposed proximate or may engage the tube portion 74. The step surface 114 may extend from the outer surface 110 to an exterior surface of the mounting flange 70. In at least one embodiment, the step surface 114 may extend radially or may be disposed substantially perpendicular to the axis 78.

The lubricant hole 116 may be fluidly connected to a lubricant passage in the tube portion 74. In at least one embodiment, the lubricant hole 116 may be a through hole that extends through the engagement portion 104. For example, the lubricant hole 116 may extend from the interior surface 90 to the outer surface 110.

A fitting opening 120 may be provided with the mounting flange 70. The fitting opening 120 may be configured as a through hole that may extend from an exterior surface of the mounting flange 70 to the hole 76. In the embodiment shown in FIG. 2, the fitting opening 120 is partially defined by the mounting flange 70 and the tube portion 74. The fitting opening 120 may receive a fitting 122 that may permit a lubricant, such as grease, to be injected into the hole 76. Alternatively, the fitting opening 120 may be provided completely in the mounting flange 70 or the brake wing 72 in one or more embodiments.

Referring to FIGS. 1 and 2, the flange portion 82 may be configured to be mounted to the spider 20. The flange portion 82 may extend outwardly from the mounting flange body 80 and may be integrally formed with the mounting flange body 80 in one or more embodiments. For example, the mounting flange body 80 and flange portion 82 may be cast as a unitary one-piece component. The flange portion 82 may include at least one mounting hole that may be aligned with a corresponding mounting hole on the spider 20. The mounting hole may receive a fastener 124 that may couple the mounting flange 70 to the spider 20.

The brake wing 72 may be coupled to the tube portion 74 and may support the actuator 30. The brake wing 72 may be spaced apart from the spider 20 and may be fixedly coupled to the tube portion 74 opposite the mounting flange 70. In at least one embodiment, the brake wing 72 may include a brake wing body 130 and a brake wing flange portion 132.

The brake wing body 130 may have a generally tubular configuration and may define a portion of the hole 76 through which the camshaft 26 may extend. The brake wing body 130 may have an interior surface 140 that may be radially disposed about the axis 78 and that may at least partially define the hole 76. The interior surface 140 may be spaced apart from the camshaft 26 to facilitate rotation of the camshaft 26 and provide a cavity for receiving lubricant.

The portion of the hole 76 in the brake wing body 130 may receive various components in addition to the camshaft 26. For example, the portion of the hole 76 in the brake wing body 130 may receive a bearing 92 and one or more seals 94 like those previously described. The bearing 92 may extend around the camshaft 26 and from the camshaft 26 to the brake wing 72 to rotatably support the camshaft 26. One or more seals 94 may also extend around the camshaft 26 and from the camshaft 26 to the brake wing 72. The seals 94 may help contain lubricant inside the hole 76 in the brake wing 72 to lubricate the bearing 92.

The brake wing body 130 may include a first brake wing body end 150 and a second brake wing body end 152. The first brake wing body end 150 may be disposed proximate the brake wing flange portion 132. The second brake wing body end 152 may be disposed opposite the first brake wing body end 150 and may be disposed proximate or may engage the tube portion 74. The second brake wing body end 152 may have an engagement portion 154. In the embodiment shown in FIG. 2, the engagement portion 154 has a male configuration that is configured to be received in the tube portion 74. The engagement portion 154 may have an outer surface 160, an end surface 162, a step surface 164, and a lubricant hole 166.

The outer surface 160 may be disposed proximate or may engage the tube portion 74. The outer surface 160 may be disposed opposite the interior surface 140 and may extend from the end surface 162 to the step surface 164. In at least one embodiment, the outer surface 160 may be a circumferential surface that may be radially disposed about the axis 78.

The end surface 162 may be disposed proximate or may engage the tube portion 74. The end surface 162 may extend from the interior surface 140 to the outer surface 160. In at least one embodiment, the end surface 162 may extend radially or may be disposed substantially perpendicular to the axis 78.

The step surface 164 may be disposed proximate or may engage the tube portion 74. The step surface 164 may extend from the outer surface 160 to an exterior surface of the brake wing 72. In at least one embodiment, the step surface 164 may extend radially or may be disposed substantially perpendicular to the axis 78.

The lubricant hole 166 may be fluidly connected to a lubricant passage in the tube portion 74. In at least one embodiment, the lubricant hole 166 may be a through hole that extends through the engagement portion 154. For example, the lubricant hole 166 may extend from the interior surface 140 to the outer surface 160.

The brake wing flange portion 132 may be configured to support the actuator 30. The brake wing flange portion 132 may extend outwardly from the brake wing body 130 and may be integrally formed with the brake wing body 130 in one or more embodiments. For example, the brake wing body 130 and brake wing flange portion 132 may be cast as a unitary one-piece component. The brake wing flange portion 132 may include one or more actuator mounting holes and an actuator shaft opening. Each actuator mounting hole may receive a fastener that may couple the actuator 30 to the brake wing 72.

Figure 3:
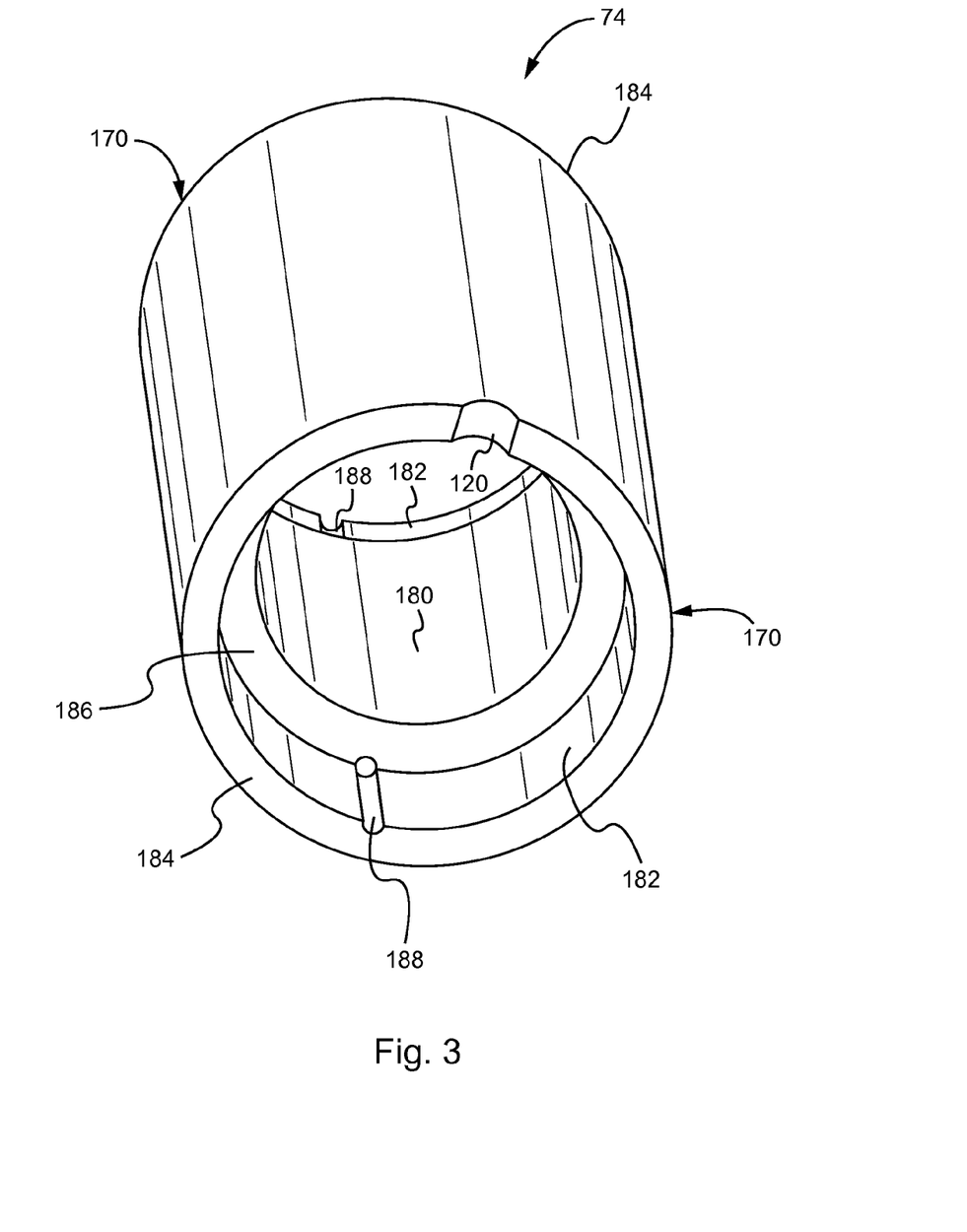
FIG. 3 is a perspective view of a tube portion that may be provided with the bracket assembly.

Referring to FIGS. 2 and 3, an exemplary tube portion 74 is shown. The tube portion 74 may extend from the mounting flange 70 to the brake wing 72. The tube portion 74 may have a generally tubular configuration and may define a portion of the hole 76 through which the camshaft 26 may extend. All or a portion of the hole 76 in the tube portion 74 may not receive lubricant or may be generally isolated from the lubricant by the seals 94 in the mounting flange 70 and the brake wing 72 in one or more embodiments. The tube portion 74 may have a pair of tube ends 170. The tube ends 170 may have similar configurations. For convenience in reference, the tube end 170 that may be disposed adjacent to the mounting flange 70 may be referred to as the first tube end and the tube end 170 that may be disposed adjacent to the brake wing 72 may be referred to as a second tube end.

In FIGS. 2 and 3, each tube end 170 is shown with a female configuration. The first tube end 170 may receive the engagement portion 104 of the mounting flange 70. The second tube end 170 may receive the engagement portion 154 of the brake wing 72. Each tube end 170 may have an inner tube surface 180, an intermediate tube surface 182, a tube end surface 184, a tube step surface 186, and a lubricant passage 188.

The inner tube surface 180 may face toward and may at least partially define the hole 76. The inner tube surface 180 may be a circumferential surface that may be radially disposed about the axis 78. The inner tube surface 180 may face toward and may be spaced apart from the camshaft 26.

The intermediate tube surface 182 may be spaced apart from the inner tube surface 180. The intermediate tube surface 182 at the first tube end may be configured to engage the outer surface 110 of the mounting flange 70 and the intermediate tube surface 182 at the second tube end may be configured to engage the outer surface 160 of the brake wing 72. The intermediate tube surface 182 may extend from the tub end surface 184 to the tube step surface 186. The intermediate tube surface 182 may be a circumferential surface that may be radially disposed about the axis 78. The intermediate tube surface 182 may face toward and may be spaced apart from the camshaft 26.

The tube end surface 184 may extend from the intermediate tube surface 182 to an exterior surface of the tube portion 74. The tube end surface 184 at the first tube end may face toward and may engage the mounting flange 70 and/or the fitting 122. The tube end surface 184 at the second tube end may face toward and may engage the brake wing 72. In at least one embodiment, the tube end surface 184 may extend radially or may be disposed substantially perpendicular to the axis 78.

The tube step surface 186 may extend from the intermediate tube surface 182 to the inner tube surface 180. The tube step surface 186 at the first tube end may engage the end surface 112 of the mounting flange 70. The tube step surface 186 at the second tube end may engage the end surface 162 of the brake wing 72. In at least one embodiment, the tube step surface 186 may extend radially or may be disposed substantially perpendicular to the axis 78.

The lubricant passage 188 may extend from the first tube end to the second tube end. The lubricant passage 188 may be spaced apart from the hole 76 and may fluidly connect and permit lubricant to flow between the mounting flange 70 and the brake wing 72. As is best shown in FIG. 3, the lubricant passage 188 may be at least partially defined in the intermediate tube surface 182. For example, the lubricant passage 188 may be configured as an open ended groove that may face toward the axis 78 and the lubricant holes 116, 166 in the mounting flange 70 and brake wing 72, respectively. As such, lubricant may pass from the portion of the hole 76 in the mounting flange 70 through the lubricant hole 116 into the lubricant passage 188 and may pass through the lubricant hole 166 in the brake wing 72 to the portion of the hole 76 in the brake wing 72 (or vice versa depending on the location of the fitting 122). Accordingly, the lubricant passage 188 may be fluidly connected to the mounting flange 70 via the lubricant hole 116, which may be disposed between the bearing 92 in the mounting flange 70 and the seal 94 disposed proximate the second body end 102 of the mounting flange 70. Similarly, the lubricant passage 188 may be fluidly connected to the brake wing 72 via the lubricant hole 166, which may be disposed between the bearing 92 in the brake wing 72 and the seal 94 disposed proximate the second tube end 170 of the brake wing 72. The lubricant passage 188 may be disposed between and may be spaced apart from the inner tube surface 180 and an exterior surface of the tube portion 74. The lubricant passage 188 may be substantially linear and may extend substantially parallel to the axis 78 from the mounting flange 70 to the brake wing 72 in one or more embodiments.

Figure 4:
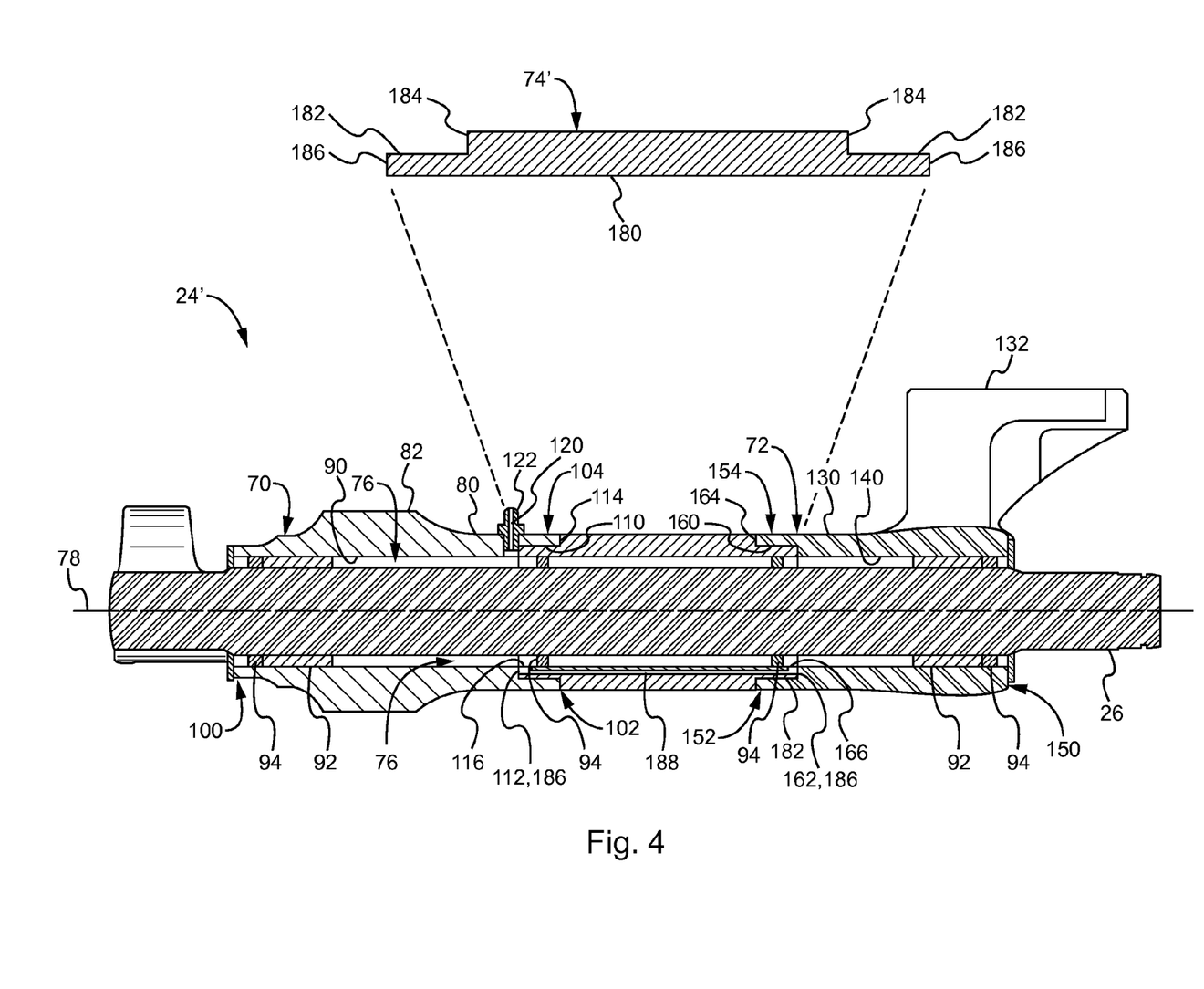
FIGS. 4 and 5 are section views of additional embodiments of the bracket assembly.

Referring to FIG. 4, another embodiment of a bracket assembly 24' is shown. This embodiment is similar to the embodiment shown in FIG. 2, except that the tube portion 74' has a male configuration in which the tube portion 74' may be received in the mounting bracket 70 and the brake wing 72.

Figure 5:
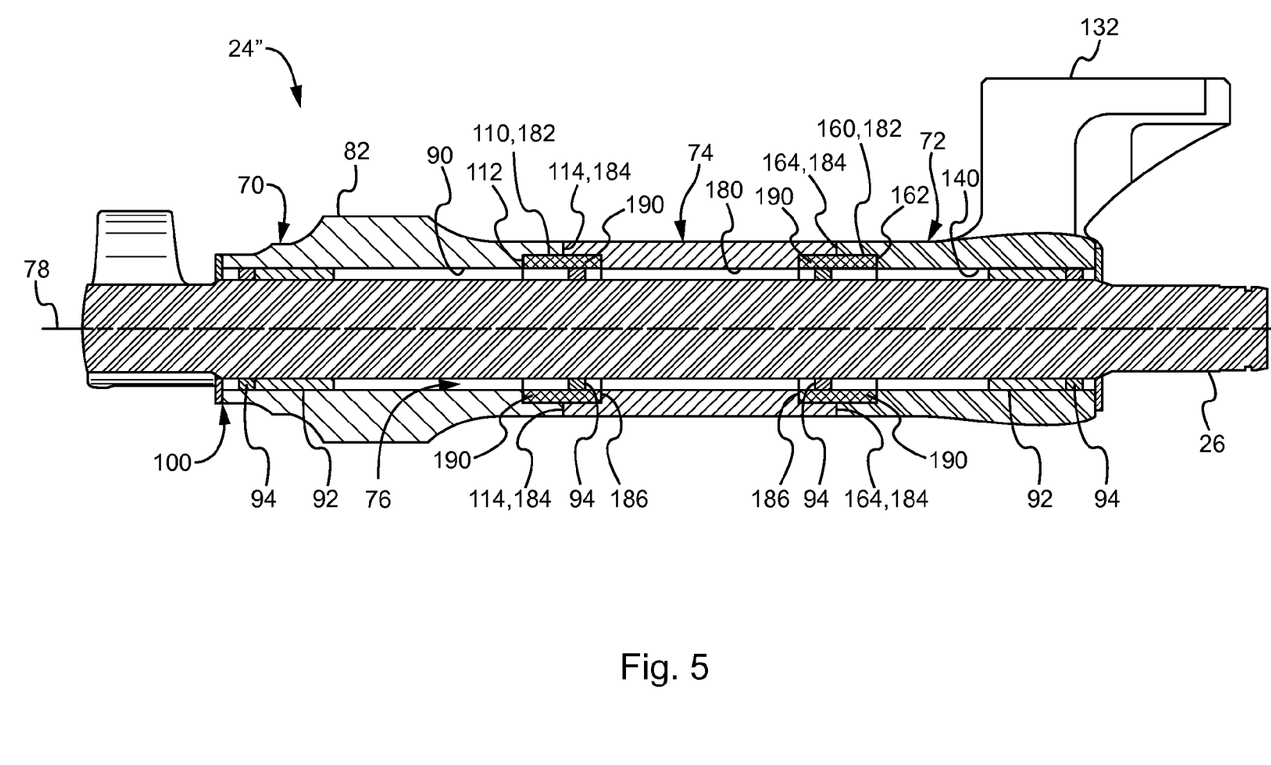

Referring to FIG. 5, another embodiment of a bracket assembly 24" is shown. In this embodiment, the mounting flange 70 and the brake wing 72 have a female configuration similar to FIG. 4. The tube portion 74 also has a female configuration similar to that shown in FIG. 1. The tube portion 74 may be coupled to the mounting flange 70 and the brake wing 72 with a pair of assembly rings 190. Each assembly ring 190 may have a ring-like configuration and may extend continuously around the axis 78 such that the assembly ring 190 is spaced apart from the camshaft 26 and at least partially defines the hole 76. Each assembly ring 190 may be disposed inside the tube portion 74 and inside either the mounting flange 70 or the brake wing 72. As such, an assembly ring 190 may have a male configuration with respect to the tube portion 74 and the mounting flange 70 or brake wing 72. For convenience in reference, the assembly ring 190 that may be disposed adjacent to the mounting flange 70 and the tube portion 74 may be referred to as the first assembly ring and the assembly ring 190 that may be disposed adjacent to the brake wing 72 and the tube portion 74 may be referred to as a second assembly ring.

Referring to FIG. 1, the camshaft 26 may be configured to actuate the brake pad assemblies 22. The camshaft 26 may extend along and may rotate about the axis 78. The camshaft 26 may extend through camshaft opening 46 in the spider 20 and the hole 76 in the bracket assembly 24. The camshaft 26 may include a cam disposed at a first end. The cam may be an S-cam and may be configured to engage the cam roller on the brake shoe 60. Rotation of the camshaft 26 may actuate the brake pad assemblies 22 such that the friction material 62 moves toward or engages an inner surface of the brake drum to brake or slow or inhibit rotation of an associated wheel. The camshaft 26 may also include a second end that is disposed opposite the first end. The second end of the camshaft 26 may engage the slack adjuster 28.

The slack adjuster 28 may be provided to compensate for brake wear or wear of the friction material 62. The slack adjuster 28 may be fixedly disposed near the second end of the camshaft 26. For example, the slack adjuster 28 may have a mounting hole that may receive the camshaft 26. In at least one embodiment, the mounting hole of the slack adjuster 28 and the camshaft 26 may have mating splines that may help couple the slack adjuster 28 and a camshaft 26 together.

The actuator 30 may be provided to actuate the camshaft 26. The actuator 30 may be of any suitable type, such as a pneumatic, hydraulic, electrical, or electromechanical actuator. The actuator 30 may include an actuator shaft 194 that may extend to or toward the slack adjuster 28. For example, the actuator shaft 194 may extend through the actuator shaft opening in the brake wing 72. The actuator 30 may move between a retracted position and an extended position. In the retracted position, the camshaft 26 may be positioned such that a brake pad assembly 22 does not engage the brake drum to brake or inhibit rotation of an associated vehicle wheel assembly. In the extended position, the actuator 30 may rotate the camshaft 26 and actuate the brake pad assemblies 22 to move toward and engage the brake drum to inhibit rotation of an associated wheel hub assembly. The actuator 30 may be fixedly mounted to the brake wing 72. For example, the actuator 30 may include one or more mounting features 196, such as a threaded mounting stud that may extend through a mounting hole in the brake wing 72 and that may receive a washer and nut to fixedly couple the actuator 30 to the brake wing 72.

Figure 6:
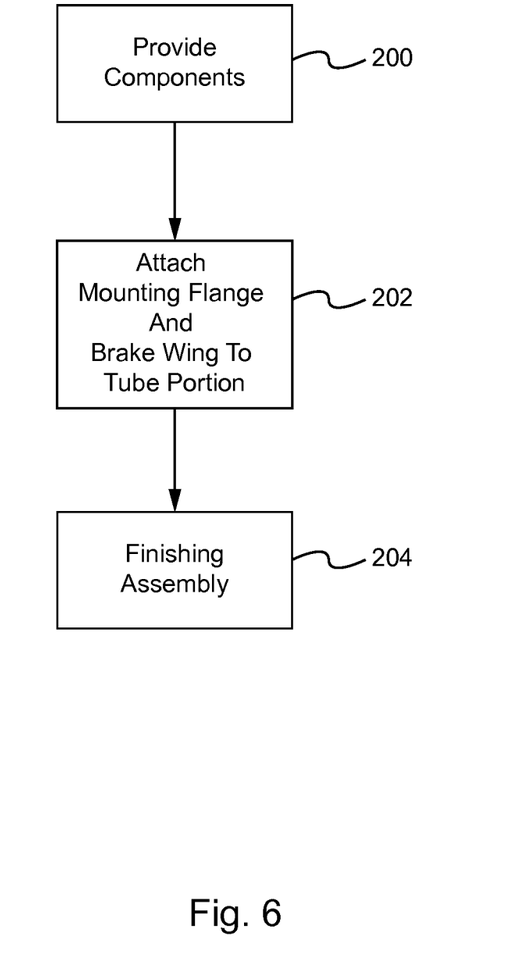
FIG. 6 is a flowchart of a method of making a bracket assembly.

Referring to FIG. 6, a flowchart of a method of making a brake assembly is shown.

At block 200, the method may begin by providing the components of the bracket assembly 24, such as the mounting flange 70, the brake wing 72, and the tube portion 74. In at least one embodiment, these components may be made of a lightweight metal or metal alloy, such as an aluminum, titanium, or magnesium alloy to help reduce weight, or any suitable metal or metal alloy that may be compatible with subsequent assembly steps. For example, the mounting flange 70 and brake wing 72 may be cast as separate one-piece components and the tube portion 74 may extruded in a manner known by those skilled in the art. In addition, machining or material removal operations may be performed on the mounting flange 70, a brake wing 72, and/or the tube portion 74. For example, the engagement portions 104, 154 of the mounting flange 70 and/or the brake wing 72 may be machined, turned, or finished to provide a desired geometry and/or surface finish, to facilitate attachment to the tube portion 74. The tube ends 170 of the tube portion 74 may be machined to provide a desired configuration, or geometry for features that are not adequately formed during the extrusion process. For instance, in a tube portion 74 having a female configuration, the tube ends 170 may be machined to provide the intermediate tube surface 182 and tube step surface 186.

At block 202, the mounting flange 70 and a brake wing 72 may be fixedly attached to the tube portion 74. The mounting flange 70 and brake wing 72 may be assembled to the tube portion simultaneously or in series. In at least one embodiment, the mounting flange 70 and brake wing 72 may be assembled to the tube portion 74 by friction stir welding. In friction stir welding, a tool may engage the parts that are to be joined and heat may be generated between the tool and the parts so as to create a softened region in the parts proximate the tool. The tool may then mechanically intermix the softened material of the parts to join the parts together. A friction stir weld joint be cooled to solidify the weld joint. Friction stir welding may provide superior weld strength without post weld heat treatment. As such, friction stir welding may facilitate the use of materials that may be lighter than steel while providing a desired weld strength. Alternatively, other welding techniques or thermal joining techniques may be utilized to weld the mounting flange 70 and/or the brake wing 72 to the tube portion 74, such as arc welding, friction welding, laser welding, or the like.

Assembly of the mounting flange 70 and brake wing 72 to the tube portion 74 may include inserting features having a male configuration into features having a female configuration. For example, in the embodiment shown in FIG. 2, the engagement portion 104 of the mounting flange 70 may be inserted into the first tube end of the tube portion 74 and the engagement portion 154 of the brake wing 72 may be inserted into the second tube portion of the tube portion 74. In the embodiment shown in FIG. 4, the first tube end of the tube portion 74 may be inserted into the engagement portion 104 of the mounting flange 70 and the second tube end of the tube portion 74 may be inserted into the engagement portion 154 of the brake wing 72. In the embodiment shown in FIG. 5, a first assembly ring 190 may be inserted into the engagement portion 104 of the mounting flange and the first tube end of the tube portion 74 and a second assembly ring 190 may be inserted into the engagement portion 154 of the brake wing 72 and the second tube end of the tube portion 74. In a configuration having an assembly ring 190, the first assembly ring 190 may be friction stir welded and intermixed with the mounting flange 70 and the tube portion 74 and the second assembly ring 190 may be friction stir welded and intermixed with the brake wing 72 and the tube portion 74.

At block 204, the bracket assembly 24 may undergo finishing operations and final assembly. For instance, finish, machining of the hole 76 and ends of the bracket assembly 24 may be performed to provide a desired tolerances and surface finishes to facilitate installation or attachment of other components. In addition, the bearings 92, seals 94, and camshaft 26 may be installed in the bracket assembly 24 and the bracket assembly 24 may be assembled with other components, such as the spider 20, slack adjuster 28, and/or actuator 30.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
    a bracket assembly that receives a camshaft for actuating a brake pad assembly, the bracket assembly including:
        a brake wing adapted to support an actuator for actuating the camshaft;
        a mounting flange that is spaced apart from the brake wing; and
        a tube portion that extends from the brake wing to the mounting flange;
    wherein the brake wing, the mounting flange, and the tube portion cooperate to define a hole that receives the camshaft, wherein the brake wing, the mounting flange, and the tube portion each form a portion of a perimeter of the hole, and the tube portion has a lubricant passage that is spaced apart from the hole and that extends from the mounting flange to the brake wing, wherein the lubricant passage routes lubricant between the brake wing and the mounting flange; and
    wherein a first bearing disposed in the hole in the mounting flange, a second bearing is disposed in the hole in the brake wing, first and second seals are disposed in the hole that inhibit lubricant from entering the portion of the hole defined by the tube portion, the first and second bearings rotatably support the camshaft, the lubricant passage is fluidly connected to the mounting flange between the first bearing and the first seal, and the lubricant passage is fluidly connected to the brake wing between the second bearing and the second seal.

2. The brake assembly of claim 1 wherein the hole is disposed along an axis and the lubricant passage extends substantially parallel to the axis.

3. The brake assembly of claim 1 wherein the tube portion has a first tube end that receives the mounting flange and a second tube end disposed opposite the first tube end that receives the brake wing.

4. The brake assembly of claim 1 wherein the tube portion has a first tube end that is received inside the mounting flange and a second tube end disposed opposite the first tube end that is received inside the brake wing.

5. The brake assembly of claim 1 further comprising a first assembly ring that is disposed inside the tube portion and the mounting flange and that is spaced apart from the camshaft, wherein the first assembly ring couples the tube portion to the mounting flange.

6. The brake assembly of claim 1 further comprising a second assembly ring that is disposed inside the tube portion and the brake wing and that is spaced apart from the camshaft, wherein the second assembly ring couples the tube portion to the brake wing.

7. The brake assembly of claim 1 wherein the mounting flange further comprises a lubricant hole that extends from the hole to the lubricant passage.

8. The brake assembly of claim 1 wherein the brake wing further comprises a lubricant hole that extends from the hole to the lubricant passage.

9. The brake assembly of claim 1 wherein the brake wing and mounting flange are partially disposed inside the tube portion.

10. A brake assembly comprising:
    a bracket assembly that receives a camshaft for actuating a brake pad assembly, the bracket assembly including:
        a brake wing adapted to support an actuator for actuating the camshaft;
        a mounting flange that is spaced apart from the brake wing; and
        a tube portion that extends from the brake wing to the mounting flange;
    wherein the brake wing, the mounting flange, and the tube portion cooperate to define a hole that receives the camshaft, the brake wing, the mounting flange, and the tube portion each form a portion of an inside circumference of the hole, the tube portion has a lubricant passage that is spaced apart from the hole and that extends from the mounting flange to the brake wing, the lubricant passage routes lubricant between the brake wing and the mounting flange, and the mounting flange has a lubricant hole that extends from the hole to the lubricant passage.

11. The brake assembly of claim 10 wherein the brake wing is partially disposed inside the tube portion.

12. The brake assembly of claim 10 wherein the mounting flange is partially disposed inside the tube portion.

13. The brake assembly of claim 10 wherein the brake wing and the mounting flange are partially disposed inside the tube portion.

14. The brake assembly of claim 10 wherein the brake wing forms a first portion of the hole, the tube portion forms a second portion of the hole, and the mounting flange forms a third portion of the hole, wherein the first, second, and third portions are axially aligned.

15. The brake assembly of claim 14 wherein the first portion extends from the second portion and the third portion extends from the second portion and is disposed opposite the first portion.

16. A brake assembly comprising:
a bracket assembly that receives a camshaft for actuating a brake pad assembly, the bracket assembly including:
a brake wing adapted to support an actuator for actuating the camshaft;
a mounting flange that is spaced apart from the brake wing; and
a tube portion that extends from the brake wing to the mounting flange;
wherein the brake wing, the mounting flange, and the tube portion cooperate to define a single hole that receives the camshaft, the brake wing, the mounting flange, and the tube portion are axially aligned and each form a portion of the single hole, the tube portion has a lubricant passage that is spaced apart from the single hole and that extends from the mounting flange to the brake wing, the lubricant passage routes lubricant between the brake wing and the mounting flange, and the brake wing further comprises a lubricant hole that extends from the single hole to the lubricant passage.

17. The brake assembly of claim 16 wherein the brake wing, the mounting flange, and the tube portion each form part of an inside circumference of the single hole.

18. The brake assembly of claim 16 wherein the brake wing and the mounting flange are partially disposed inside the tube portion.

19. The brake assembly of claim 16 further comprising a first seal and a second seal that are disposed in the single hole, wherein the first seal and the second seal inhibit lubricant from entering the portion of the single hole defined by the tube portion.

20. A brake assembly comprising:
a bracket assembly that receives a camshaft for actuating a brake pad assembly, the bracket assembly including:
a brake wing adapted to support an actuator for actuating the camshaft;
a mounting flange that is spaced apart from the brake wing; and
a tube portion that extends from the brake wing to the mounting flange;
wherein the brake wing, the mounting flange, and the tube portion cooperate to define a hole that receives the camshaft such that the brake wing, the mounting flange, and the tube portion each form a portion of an inside circumference of the hole, a first seal and a second seal are disposed in the portion of the hole defined by the tube portion and inhibit lubricant from entering the portion of the hole defined by tube portion from the portions of the hole defined by the brake wing and mounting flange, the tube portion has a lubricant passage that is spaced apart from the hole and that extends from the mounting flange to the brake wing, and the lubricant passage routes lubricant between the portion of the hole defined by the mounting flange and the portion of the hole defined by the brake wing.

* * * * *

UNITED STATES PATENT AND TRADEMARK OFFICE
CERTIFICATE OF CORRECTION

PATENT NO. : 9,677,628 B2  
APPLICATION NO. : 14/027595  
DATED : June 13, 2017  
INVENTOR(S) : Peter Moss et al.

It is certified that error appears in the above-identified patent and that said Letters Patent is hereby corrected as shown below:

Column 9, Line 63, Claim 1:  
After "a first bearing"  
Insert -- is --.

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*